United States Patent
Kulkarni et al.

(10) Patent No.: US 10,785,145 B2
(45) Date of Patent: Sep. 22, 2020

(54) SYSTEM AND METHOD OF FLOW AWARE RESILIENT ECMP

(71) Applicant: Arista Networks, Inc., Santa Clara, CA (US)

(72) Inventors: Vijaya Kumar Kulkarni, Bangalore (IN); Bhaskar Jain, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/899,242

(22) Filed: Feb. 19, 2018

(65) Prior Publication Data

US 2019/0260670 A1 Aug. 22, 2019

(51) Int. Cl.
| | |
|---|---|
| H04L 12/28 | (2006.01) |
| H04L 12/709 | (2013.01) |
| H04L 12/757 | (2013.01) |
| H04L 12/721 | (2013.01) |

(52) U.S. Cl.
CPC .......... *H04L 45/245* (2013.01); *H04L 45/023* (2013.01); *H04L 45/123* (2013.01); *H04L 45/38* (2013.01)

(58) Field of Classification Search
CPC .................................................. H04L 45/245
See application file for complete search history.

(56) References Cited

U.S. PATENT DOCUMENTS

| | | | |
|---|---|---|---|
| 9,923,798 B1 * | 3/2018 | Bahadur | H04L 45/00 |
| 2010/0061269 A1 * | 3/2010 | Banerjee | H04L 12/4675 370/254 |
| 2011/0013639 A1 * | 1/2011 | Matthews | H04L 45/00 370/395.32 |
| 2011/0283013 A1 * | 11/2011 | Grosser | H04L 61/103 709/232 |
| 2012/0230194 A1 * | 9/2012 | Matthews | H04L 45/7453 370/235 |
| 2015/0092564 A1 * | 4/2015 | Aldrin | H04L 41/5038 370/241.1 |
| 2015/0163146 A1 * | 6/2015 | Zhang | H04L 47/125 370/238 |
| 2016/0156551 A1 * | 6/2016 | Gafni | H04L 45/50 370/392 |
| 2017/0012870 A1 * | 1/2017 | Blair | H04L 12/4633 |
| 2017/0331739 A1 * | 11/2017 | Sharma | H04L 63/0254 |
| 2018/0351864 A1 * | 12/2018 | Jeganathan | H04L 47/125 |
| 2019/0260670 A1 * | 8/2019 | Kulkarni | H04L 45/123 |
| 2020/0021483 A1 * | 1/2020 | Boutros | H04L 69/40 |

* cited by examiner

*Primary Examiner* — Gerald A Smarth
(74) *Attorney, Agent, or Firm* — Haley Guiliano LLP (57) ABSTRACT

A method and apparatus of a network element that processes network data in an equal cost multi-path (ECMP) group is described. In an exemplary embodiment, the network element receives the network data, where the network data is part of network data flow. In addition, the network element detects that the network data flow is a new network data flow and selects a transmitting nexthop from a plurality of nexthops of the ECMP group. The network element further maps the new network flow to a slot of a table in an ECMP group and transmits the network data using the transmitting nexthop.

15 Claims, 9 Drawing Sheets

SYSTEM AND METHOD OF FLOW AWARE RESILIENT ECMP

FIELD OF INVENTION

This invention relates generally to data networking, and more particularly, to managing flow aware resilient Equal Cost Multi-Path (ECMP) routing.

BACKGROUND OF THE INVENTION

A network can take advantage of a network topology that includes a multi-link group from one host in the network to another host. This multi-link group allows network connections to increase throughput and provide redundancy in case a link in the equal cost segment group goes down. A multi-link group can be an aggregation of links from one network device connected to another device or a collection of multiple link paths between network devices. An example of a multi-link group is an Equal Cost Multipath (ECMP) and Link Aggregation Groups (LAG).

There are number of ways that a network element can use to select which link in a multi-link group to transport the packet to a destination device. For example, in order to increase the randomness and to avoid polarization of the traffic for existing ECMP nexthop selection functions, randomization per network element is introduced by looking at unique inputs like random seed per box, random hash function, incoming interface etc. A problem can occur when next hops are added or withdrawn, because packet flows can be mapped to different ECMP next hops.

SUMMARY OF THE DESCRIPTION

A method and apparatus of a network element that processes network data in an equal cost multi-path (ECMP) group is described. In an exemplary embodiment, the network element receives the network data, where the network data is part of network data flow. In addition, the network element detects that the network data flow is a new network data flow and selects a transmitting nexthop from a plurality of nexthops of the ECMP group. The network element further maps the new network flow to a slot of a table in an ECMP group and transmits the network data using the transmitting nexthop.

In a further embodiment, a method and apparatus of a network element that manages an equal cost multi-path (ECMP) group in a network element is described. In one embodiment, the network element detects an addition to a membership of an ECMP group, wherein the addition is a new nexthop for the ECMP group. In addition, the network element allocates a slot in an ECMP group table for the new nexthop, wherein a packet flow using this nexthop is mapped to the slot.

In another embodiment, a method and apparatus of a device that installs an equal cost multi-path (ECMP) nexthop selection function in a network element is described. In one embodiment, the device receives information regarding a plurality of network element in a network. In addition, the device selects a subset of network elements from the plurality of network elements, wherein each of the network elements in the subset share a class and participate in an ECMP group. Furthermore, the device determines the ECMP next selection function for the subset of network elements. The device additionally sends a command to each of the network elements in the subset of network elements, wherein the command instructs the each of network elements to install the ECMP next selection function and the each of the network elements uses the ECMP next selection function to make ECMP nexthop decisions using the ECMP group.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a network element that processes network data in an equal cost multi-path (ECMP) group is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes network data in an equal cost multi-path (ECMP) group is described. In one embodiment, for an IP fabric in the data center, the network elements are interconnected in a CLOS fabric at multiple layers up to two to three in general. The bottom most layer is called the leaf layer in which the network elements will be the top-of-the-racks (ToRs) network elements connecting to server end points to the network. The layers of network elements above leaf network elements can be spine/super spine. In one embodiment, instead of a manufacturer setting the ECMP nexthop selection functions, an EMP nexthop selection function can be installed for network elements within a class of network elements (e.g., leaf, spine, or super spine). In this embodiment, the resiliency for failures at these fabric layers is increased by allowing a customer to configure and/or install in ECMP nexthop selection functions. In one embodiment, ECMP is a routing strategy where nexthop packet forwarding to a destination can occur over multiple best paths having equal costs in a routing metric. ECMP can be used with many different routing protocols. In one embodiment, an ECMP nexthop selection function is a function that is used to select an ECMP nexthop for a packet.

In one embodiment, existing ECMP nexthop selection functions will, in order for increasing the randomness and to avoid polarization of the traffic, introduce randomization per network element by looking at unique inputs like random seed per box, random hash function, incoming interface etc. In one embodiment, each network element at a given layer (e.g. each of the leaf, spine, or super spine network element), will implement the same ECMP nexthop selection function with the same set of inputs to produce same hash index for a given flow. The hashing scheme can be different for the network element in different layers, but the network element in the same layer will be having identical hashing function with identical inputs. In a data center fabric, if a network element in spine layer fails, the super spine network element would send the flow to a different operating spine network element. This new spine network element would remap the flow back to the same next layer network element as the failed spine network element would have mapped. In one embodiment, having the same ECMP nexthop selection function makes a failure of a network element or link at a particular layer a non-issue and flows are more resilient. The same mechanism will also make concurrent failures in multiple layers also to be resilient.

In one embodiment, a controller can distribute and configure the ECMP nexthop selection function layer by layer to the corresponding network elements in the network. In another embodiment, in the absence of controller, a customer could use a pre-established hash functional polynomial/inputs (e.g., each network element can be configured statically via a command line interface (CLI) or configuration file).

In a further embodiment, after addressing the resiliency in the fabric, further resiliency can be accomplished by addressing the churn in the ECMP member set in the presence of advertise and withdrawals of anycast IP addresses. In this embodiment, using flow awareness for a given ECMP nexthop group set and making some opportunistic decisions in inserting the newly added nexthop into the set can increase the resiliency in the fabric and/or service advertisements and/or withdrawals.

As describe above, and in one embodiment, in the ECMP nexthop selection schemes, a given nexthop would map to a fixed index in the ECMP nexthop group table so that the order of next-hop discoveries for a given ECMP route there have minimum disruption for the existing flows, e.g., a flow "owns" a slot index. In this embodiment, when a new nexthop for an endpoint is discovered, rather than adding the new nexthop directly into the slot, the network element performs eviction based on user defined "policy".

In one embodiment, the network element can use a simple policy that states that a new nexthop can be added either immediately or after a configurable delay. The delay in adding the new endpoint helps to relocate the application context for the existing flows to new service endpoint so that there will be no disruption when the old flow shows at the new end point. In addition to this, the customer can also define flow aware policies by making use of the following "flow aware" variables. In one embodiment, the flow aware variables are the number of flows that are currently mapped to that slot and the "Flow Activity" per slot within an ECMP next hop group set. In this embodiment, "Flow Activity" is a computed variable that measures the aggregated usage of the slot in absolute bandwidth terms with respect to traffic mapped to that slot. For example and in embodiment, if the maximum number of nexthops is N, if there is a new nexthop, this nexthop is added to a slot that is less than the threshold.

For example and in one embodiment, a user policy can define the new nexthop to be added if there are less than 10 flows being mapped to the corresponding slot. In addition, a nexthop eviction happens when the "Flow Activity" is above/below a threshold. Alternatively, one can include both the number of flows and "Flow Activity" to define the combined necessary condition to be met for eviction.

In one embodiment, these policies can be defined in a centralized controller and distributed across the network element for uniform behavior across the data center. In this embodiment, this policy based resilience, combined with customer's own context relocation mechanisms provide a very powerful tool to the customer in making sure of end to end resilience.

Figure 1:
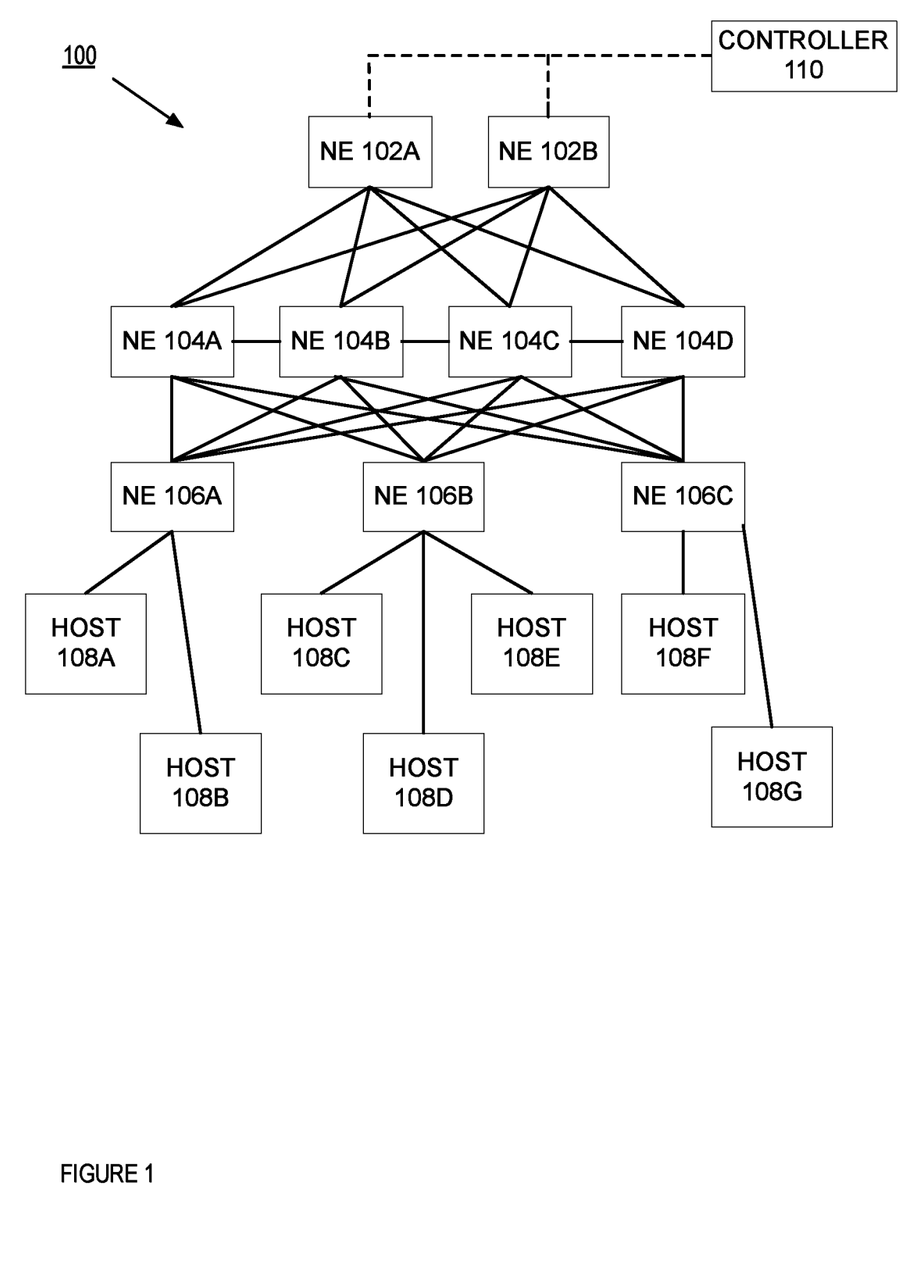
FIG. 1 is a block diagram of one embodiment of a network with multiple equal-cost paths.

FIG. 1 is a block diagram of one embodiment of a network 100 with multiple equal-cost paths. In FIG. 1, the network 100 includes spine network elements 104A-D that are coupled to each of the leaf network elements 106A-E. The leaf network element 106A is further coupled to hosts 108A-B, leaf network element 106B is coupled to hosts 108C-D, and leaf network element 106C is coupled to network element 108E. In one embodiment, a spine network element 104A-D is a network element that interconnects the leaf network elements 106A-E. In this embodiment, each of the spine network elements 104A-D is coupled to each of the leaf network elements 106A-E. Furthermore, in this embodiment, each of the spine network elements 104A-D are coupled with each other. While in one embodiment, the network elements 104A-D and 106A-E are illustrated in a spine and leaf topology, in alternate embodiments, the network elements 104A-D and 106A-E can be in a different topology. In one embodiment, each of the network elements 102A-B, 104A-D and/or 106A-E can be a router, switch, bridge, gateway, load balancer, firewall, network security device, server, or any other type of device that can receive and process data from a network. In addition, the super spine network elements 102A-B are network element that provides network access to the network 110 for network elements 104A-D, network elements 106A-C, and hosts 108A-E. As illustrated in FIG. 1, the super spine network elements 102A-B are coupled to each of the spine network elements 104A-D. In one embodiment, the super spine network elements 102A-B can each be a router, switch, or another type of network element that can provide network access for other devices. While in one embodiment, there are four spine network elements 104A-D, three leaf network elements 106A-C, one super spine network elements 102A-B, and five hosts 108A-E, in alternate embodiments, there can be more or less numbers of spine network elements, leaf network elements, WAN network element, and/or hosts. In one embodiment, a controller 110 is coupled the network elements 102A-B, 104A-D, and 106A-C.

In one embodiment, the network elements 104A-D and 106A-C can be the same or different network elements in terms of manufacturer, type, configuration, or role. For example and in one embodiment, network elements 104A-D may be routers and network elements 106A-C may be switches with some routing capabilities. As another example and embodiment, network elements 104A-D may be high capacity switches with relatively few 10 gigabit (Gb) or 40 Gb ports and network elements 106A-E may be lower capacity switches with a large number of medium capacity port (e.g., 1 Gb ports). In addition, the network elements may differ in role, as the network elements 104A-D are spine switches and the network elements 106A-C are leaf switches. Thus, the network elements 104A-D and 106A-E can be a heterogeneous mix of network elements.

If one of the leaf network elements 106A-C is transmitting a packet to another leaf network element 106A-C, the source network element 106A-C has choice of which spine network element 104A-D to use to forward the packet to the destination leaf network element 106A-C. For example and in one embodiment, if host 108A transmits a packet destined for host 108E, host 108A transmits this packet to the leaf network element coupled to host 108A, leaf network element 106A. The leaf network element 106A receives this packet and determines that the packet is to be transmitted to one of the spine network elements 104A-D, which transmits that packet to the leaf network element 106C. The leaf network element 106C then transmits the packet to the destination host 106E.

Because there can be multiple equal cost paths between pairs of leaf network elements 106A-C via the spine network elements, the network element 106A can use a multi-link group (e.g., equal-cost path (ECMP), multiple link aggregation group (MLAG), link aggregation, or another type of multi-link group). In one embodiment, ECMP is a routing strategy where next-hop packet forwarding to a single destination can occur over multiple "best paths" which tie for top place in routing metric calculations. Many different routing protocols support ECMP (e.g., Open Shortest Path First (OSPF), Intermediate System to Intermediate System (ISIS), and Border Gateway Protocol (BGP)). ECMP can allow some load balancing for data packets being sent to the same destination, by transmitting some data packets through one next hop to that destination and other data packets via a different next hop. In one embodiment, the leaf network element 106A that uses ECMP makes ECMP decisions for various data packets of which next hop to use based on which traffic flow that data packet belongs to. For example and in one embodiment, for a packet destined to the host 108E, the leaf network element 106A can send the packet to any of the spine network elements 104A-D.

In one embodiment, because there are multiple different spine network elements 104A-D the leaf network element 106A can use to transport the packet to the destination leaf network element 106C and host 108E, the leaf network element 106A uses a link selection mechanism to select which one of the links in the multi-link group to the spine network elements 104A-D to transport this packet.

There are number of ways that the leaf network element 106A can use to select which link, and which spine network element 104A-D, is used to transport the packet to the destination host 108E. In one embodiment, the leaf network element 106A can use a round-robin link selection mechanism, a load based link selection mechanism, a hash-based link selection mechanism, or a different type of link selection mechanism. In one embodiment, a round-robin link selection mechanism is a link selection mechanism that rotates through the links used to transmit packets. For example and in one embodiment, if the leaf network element 106A received four packets destined for host 108E, the leaf network element 106A would use the first link and spine network element 104A to transport the first packet, the second link and spine network element 104B to transport the second packet, the third link and spine network element 104C to transport the third packet, and the fourth link and spine network element 104D to transport the fourth packet.

In order to avoid the reordering of packets within a dataflow, the leaf network element 106A can use a hash-based link selection mechanism, where a link is selected based on a set of certain packet characteristics. For example and in one embodiment, the leaf network element 106A can generate a hash based on the source and destination Internet Protocol (IP) addresses, source and destination ports, and type of packet (e.g., whether the packet is a TCP or Uniform Datagram Protocol (UDP) packet). Using a hash-based link selection mechanism allows for the packets in a dataflow to be transmitted on the same link in via the same spine network element 104A-D to the destination host. This reduces or eliminates out of order packets. A problem with hash-based link selection mechanisms is that these types of selection mechanisms is not as efficient in spreading the load among the different links and spine network elements 104A-D. For example and in one embodiment, if two data flows end up with the same link selection, then one link and one of the spine network elements 104A-D would be used for the packets in these data flows and the other links and spine network elements 104A-D would not be used for these packet transports.

In one embodiment, existing resilient ECMP Hashing schemes try to keep flow disruption for the existing flows to the minimum in the presence of nexthops addition/deletion for a given ECMP route. As described above, choosing the next hop for each packet happens through hashing over the packet header fields. For example and in one embodiment, several ECMP hashing methods are presented in RFC 2991, such as using a modulo-N hash. In a modulo-N hash, the packet header fields are hashed and the result is modulo N-ed (where N is the number of next hops).

A limitation, however, to modulo-N hashing is its poor handling of addition and deletion of next hops. In this example, when a new next hop is added/deleted the value of N changes, which can the next hop for the majority of packets. As an example, and embodiment, if a packet flow is being hashed to used one network element for forwarding (e.g., network element 104C), if the value of N changes by adding or deleting one of the network elements, packets from this same flow, could be hashed to use a different network element for forwarding (e.g., network element 104A). In addition, changing packet flow to a different next hop can break the actual flow these packets belong to. For example and in one embodiment, if the packet flow is a TCP session for a network service, changing forwarding the packets can cause a disruption in this TCP session (e.g., reordering the packets in the TCP session).

In one embodiment, the existing solutions in the networking layer/IP fabric in the data center are trying to solve the problem at an individual box level that can still lead to flow disruptions in the event of link failures, node failures, or service end point withdrawals or additions. In this embodiment, a customer requirement is to, given an anycast IP address representing a service, reach the same end point (e.g., a device that is connected to leaf network element) since an application context, such as NAT, is maintained there. If same flow ends up reaching a different leaf network element in the presence of failures (e.g., a spine node failure in the IP fabric), it will result in flow disruptions.

Figure 3A:
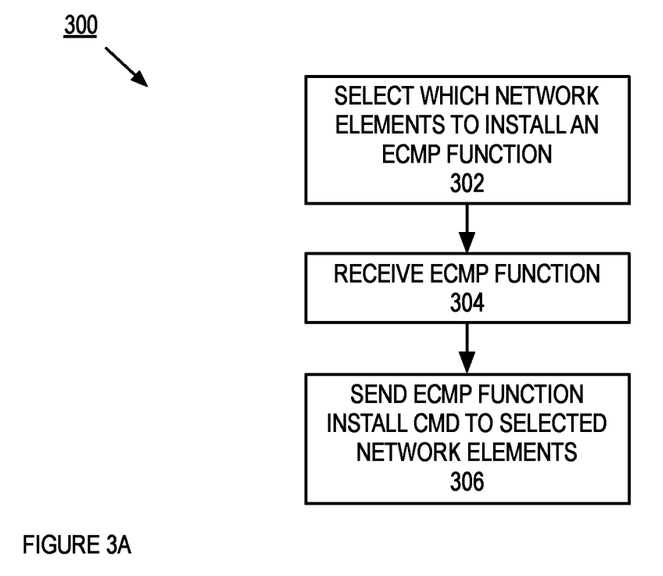
FIG. 3A is a flow diagram of one embodiment of a process to install an ECMP function on one or more network elements.
Figure 3B:
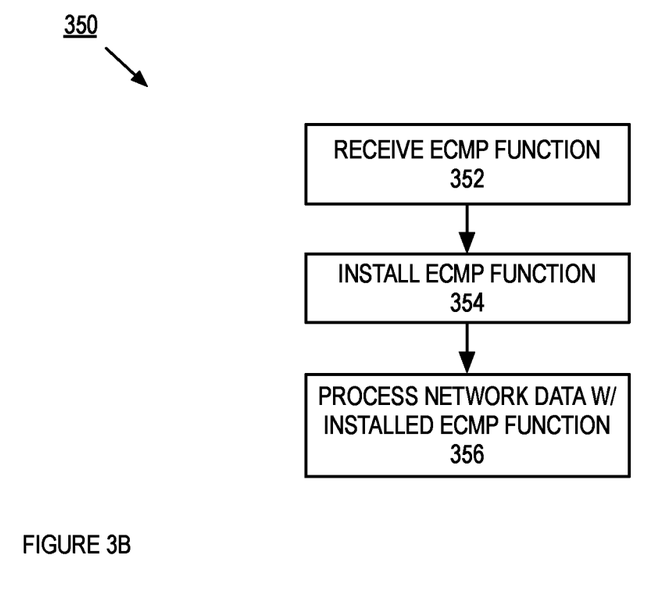
FIG. 3B is a flow diagram of one embodiment of a process to install an ECMP function on a network element.

In one embodiment, in order to lessen possible disruptions of packet flows resulting from the addition and deletion of next hops, the network increases resiliency in the fabric and/or increases resiliency in the presence of service advertisements and withdrawals. In one embodiment, the network increases resiliency in the fabric by making failures in the IP fabric agnostic in terms of reaching the same end point for a given flow. In this embodiment, for the failures to be agnostic in the IP fabric, each (or some) of the network elements in the network can install customer configurable ECMP nexthop selection functions to the various nodes in the network depending on the role the network elements are playing in the network (leaf/spine/super-spine). By having customer configurable ECMP nexthop selection functions, instead depending on a manufacturer's hardwired ECMP nexthop selection functions that may depend on the manufacturer and configuration of a particular network element, a customer can have some consistency or predictability in how the ECMP nexthop selection functions performs in normal fashion and when next hops are added and/or deleted. Resiliency in the fabric is further described in FIG. 3 below.

In addition, or instead of, an in one embodiment, the network can increase resiliency in the presence of service advertisements and withdrawals. In this embodiment, this increased resiliency can result from, at the individual network element level, bringing in the flow awareness in adding and deleting the nexthops in an ECMP set. This can be termed, in one embodiment, "policy based" resilience. In one embodiment, the policy based resilience can include distribution of hash functions depending on the role of the node in the network, policy based control for resiliency, implementation of flow variables, and/or distribution of such policies.

In one embodiment, the controller 110 can be used to install the ECMP nexthop selection functions on the different classes of network elements, centralize policies for resiliency and/or other policies. In this embodiment, the controller 110 can be a personal computer, laptop, server, mobile device (e.g., smartphone, laptop, personal digital assistant, music playing device, gaming device, etc.), network element, and/or any device capable of executing a process.

Figure 2A:
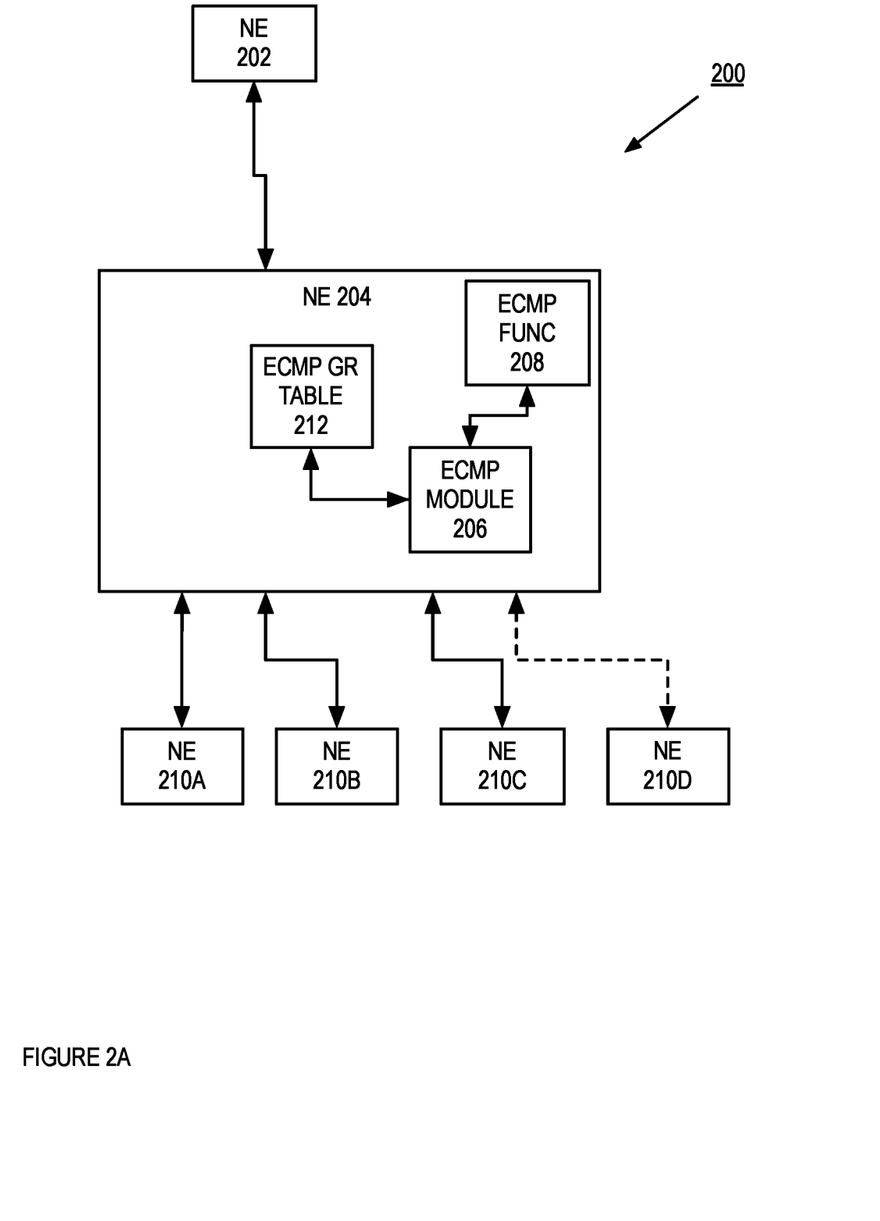
FIG. 2A is a block diagram of one embodiment of a network element that manages ECMP routing.

FIG. 2A is a block diagram of one embodiment of a network element 204 that manages ECMP routing. In one embodiment, the network element 304 can be a leaf, spine, or super spine network element as illustrated in FIG. 1 above, or any other type of network element that selects a nexthop to transmit a network data using ECMP. In FIG. 2, network element 204 is coupled to a network element 202 and network elements 210A-C. In one embodiment, network element 204 is a spine network element, network element 202 is a super spine network element, and network elements 210A-C are leaf network elements. In another embodiment, the network elements 204, 202, 210A-C, 210D can another type of network element (e.g., leaf, spine, or super spine network element).

In one embodiment, the network element 204 includes an ECMP function 208 that is a customer configurable ECMP nexthop selection function. In one embodiment, the customer configurable ECMP next selection function to the various nodes in the network depending on the role the nodes are playing in the network (leaf/spine/super-spine). By having customer configurable ECMP nexthop selection functions, instead depending on a manufacturer's hardwired ECMP nexthop selection functions that may depend on the manufacturer and configuration of a particular network element, a customer can have some consistency or predictability in how the ECMP nexthop selection functions performs in normal fashion and when next hops are added and/or deleted. In this embodiment, the ECMP function 208 can be installed using a controller (e.g., such as controller 110 as described in FIG. 1 above), inputted using a CLI, as part of a configuration for the network element, or installed via some other means. In one embodiment, each of the network elements with the same or similar roles (e.g., leaf, spine, or super spine roles) can have the same or similar ECMP functions 208 installed. In this embodiment, by having the same (or similar) ECMP function 208 for each layer of network elements, the resiliency of flows is improved. In a data center fabric, if a network element in spine layer fails, the super spine network element would send the flow to a different operating spine network element. This new spine network element would remap the flow back to the same next layer network element as the failed spine network element would have mapped. In one embodiment, having the same ECMP nexthop selection function makes a failure of a network element or link at a particular layer a non-issue and flows are more resilient.

The network element 204, in one embodiment, can include an ECMP module 206 that is used to process network data and allocate a new slot in an ECMP group table. In one embodiment, a customer can use anycast IP address for services to provide load balance in the datacenter. An endpoint (e.g., one or more of hosts 108A-G as illustrated in FIG. 1) would advertise or withdraw the anycast IP to indicates the endpoint's interest/disinterest in the service. In case of a new advertisement of a service endpoint, this make a leaf network element attached to the endpoint to be a new member in the ECMP set, which triggers the desire to update all the spine network element's nexthop for that anycast IP with this new information. There are, however, conflicting goals here between resiliency and load balancing. From resiliency perspective, a customer does not want any existing flows to be remapped to the new endpoint since the context (e.g., a NAT from anycast to specific service end point) for those existing flows is not yet present in the new endpoint. From a load-balancing perspective, at the same time, a customer would wish that the network element is actually to direct the traffic towards the new end point to make sure all the endpoints are fairly balanced.

In one embodiment, the ECMP module 206 can map a given nexthop to a fixed index in the ECMP nexthop group table so that the order of nexthop discoveries for a given ECMP route there have minimum disruption for the existing flows, e.g., a flow "owns" a slot index. In this embodiment, when a new nexthop for an endpoint is discovered, rather than adding the new nexthop directly into the slot, the network element performs eviction based on user defined "policy".

In one embodiment, the ECMP module 206 can use a simple policy that states that a new nexthop can be added either immediately or after a configurable delay. The delay in adding the new endpoint helps to relocate the application context for the existing flows to new service endpoint so that there will be no disruption when the old flow shows at the new end point. In addition to this, the customer can also define flow aware policies by making use of the following "flow aware" variables. In one embodiment, the flow aware variables are the number of flows that are currently mapped to that slot and the "Flow Activity" per slot within an ECMP next hop group set in the ECMP group table 212. In this embodiment, "Flow Activity" is a computed variable that measures the aggregated usage of the slot in absolute bandwidth terms with respect to traffic mapped to that slot.

For example and in one embodiment, a user policy can define the new nexthop to be added if there are less than 10 flows being mapped to the corresponding slot. In addition, a nexthop eviction happens when the "Flow Activity" is above/below a threshold. Alternatively, one can include both the number of flows and "Flow Activity" to define the combined necessary condition to be met for eviction. The ECMP group table is further described in FIG. 2B below.

In one embodiment, as described above, these policies can be defined in a centralized controller and distributed across the network element for uniform behavior across the data center. In this embodiment, this policy based resilience, combined with customer's own context relocation mechanisms provide a very powerful tool to the customer in making sure of end to end resilience.

In one embodiment, a service announcement can cause a new nexthop to join the ECMP group. In this embodiment, a host (not illustrated) coupled to network element 210D can bring up a service that results in a service advertisement from the host. In response to the service advertisement from the host, the network element 210D forwards the service advertisement to the network element 204. The service advertisement forwarded from network element 210D can cause network element 204 to add network element 210D to the ECMP group for this anycast IP for this service. In one embodiment, there is a different ECMP group for different nexthop sets. In this embodiment, if two anycast IP addresses have the same nexthop sets, these nexthop sets are in the same ECMP group. If two anycast IP addresses have different nexthop sets, these nexthop sets belong to different ECMP groups. For example and one embodiment, if a first anycast IP address has nexthops A, B, and C and a second anycast IP address has nexthops B and C. In this example, the first and second anycast IP addresses would belong to two different ECMP groups. If the second anycast IP address later has nexthops A, B, and C, the first and second anycast IP addresses would have the same ECMP groups. If, at some other time, a nexthop D is added to the first anycast IP address (or a nexthop is dropped for the first or second anycast IP addresses), the first and second anycast IP addresses would be in different ECMP groups.

Figure 2B:
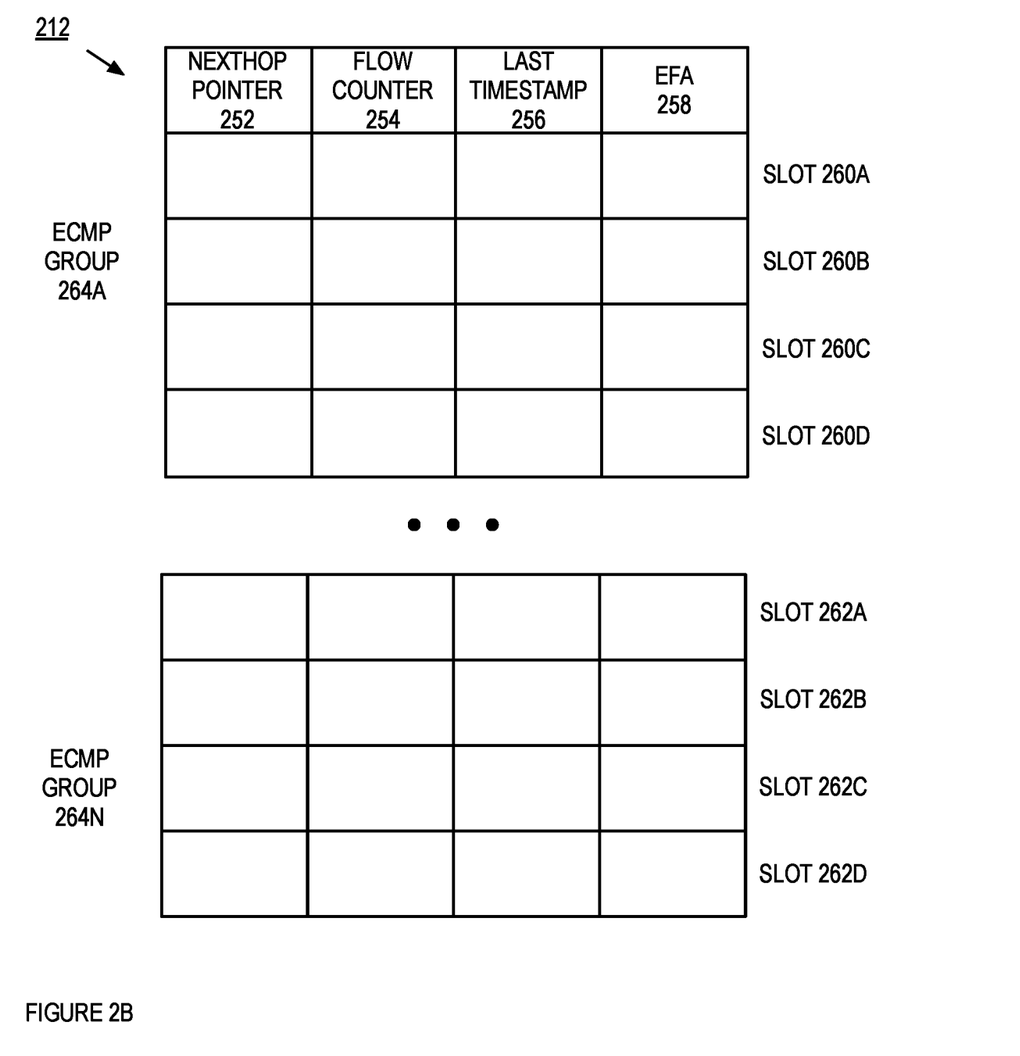
FIG. 2B is a block diagram of one embodiment of an ECMP group table for N ECMP groups.

FIG. 2B is a block diagram of one embodiment of an ECMP group table 212 for N ECMP groups 264A-N. In FIG. 2B, the ECMP group table 212 includes ECMP groups 264A-N. Each of the ECMP groups 264A-N includes slots for each of the next hops in this group. For example and in one embodiment, ECMP group 264A includes slots 260A-D and ECMP group 264N includes 262A-N. While in embodiment, each of the ECMP groups 264A and N includes four slots, in alternate embodiments, each of the ECMP groups 264A-N can be have more or less slots.

In one embodiment, the ECMP group table includes fields for nexthop pointer 252, flow counter 254, last timestamp 256, and Estimate Flow Activity 258. In one embodiment, the nexthop pointer is a pointer to the nexthop for the flow(s) mapped to this slot. In one embodiment, the flow counter is the number of flow(s) mapped to this slot. The last timestamp, in one embodiment, is the last timestamp a packet was mapped to the slot. For example and in one embodiment, the current timestamp is updated when a packet gets switched by using the nexthop information in that slot.

Because it can be expensive to keep track of per flow statistics, the network element measures a number of unique flows that are currently mapped to a given slot by, at the time nexthop information is accessed in the hardware that is after the hash computation for a received packet is done, the network element increments the "number of flows counter" if the packet header has TCP SYN flag set. When a packet is being forwarded to the end node and a FIN flag is present in the packet, "the number of flows counter" will be decremented. For the non-TCP packets, the network element can do deep packet inspection at user defined field to look at the application data and identify the start and end of flows and accordingly the number of flows.

In one embodiment, the estimated flow activity is a computed measurement updated against the slot, every time a packet gets switched through using that slot in the next hop group table. This metric measures how "busy" the slot is with respect to the traffic in absolute bandwidth terms. In one embodiment, the estimate flow activity (EFA) is calculated using the following weighted average formula:

$$EFA=(1-\alpha)*EFA+\alpha*(timeNow-timestampIntheSlot)$$

Timestamp against the slot is then updated with the current timestamp.

$$timestampIntheSlot=timeNow$$

Essentially, in this embodiment, (timeNow−timestampIntheSlot) provides inter-arrival time for packets for that slot. In addition, $\alpha$ can be the weight that is bounded between 0 and 1. A weight of 1 will result in accounting only for the latest packet arrival event. Lower the EFA, higher the traffic through the slot. A user policy can make use of this variable in arriving at a decision to evict the slot. This measure will provide an important feedback as how much of traffic can potentially be disturbed if we choose to replace it with the new nexthop.

FIG. 3A is a flow diagram of one embodiment of a process 300 to install an ECMP function on one or more network elements. In one embodiment, process 300 is performed by a controller, such as the controller 110 as described in FIG. 1, block 110 above. In FIG. 3A, process 300 begins by selectin which network elements to install an ECMP nexthop selection function at block 302. In one embodiment, process 300 can select the network elements based on at least one or more of: customer input, role of network element (e.g., leaf, spine, or super spine), network element manufacturer, network element model, network element configuration, and/or another network element characteristic. For example and in one embodiment, a customer can select network elements with a similar role in part or all of the network, such as selecting the leaf, spine, or super spine network elements. At block 304, process 300 receives the ECMP nexthop selection function. In one embodiment, process 300 receives this function from customer input, such as from a CLI input, network management station input, and/or other types of input. Process 300 sends a command to install the EMCP nexthop selection function to the one or more network elements selected at block 302.

As described above, a controller can be used to install an ECMP nexthop selection function for a class of network elements. FIG. 3B is a flow diagram of one embodiment of a process 350 to install an ECMP function on a network element. In one embodiment, an ECMP module performs process 350 to install the ECMP nexthop selection function, such as the ECMP module 206 as described in FIG. 2 above. In FIG. 3B, process 350 begins by receiving the ECMP nexthop selection function at block 352. In one embodiment, the ECMP nexthop selection function is a function that is used to select an ECMP nexthop for a packet. At block 354, process 350 installs the ECMP nexthop selection function. In one embodiment, process 350 updates a configuration of the network element to use the ECMP nexthop selection function for processing network data received by this network element. With the installed ECMP nexthop selection function, process 350 processes network data received by the network element using the ECMP nexthop selection function. In one embodiment, the network element applies the ECMP nexthop selection function to a received packet to select one of the ECMP nexthops for transmission.

Figure 4:
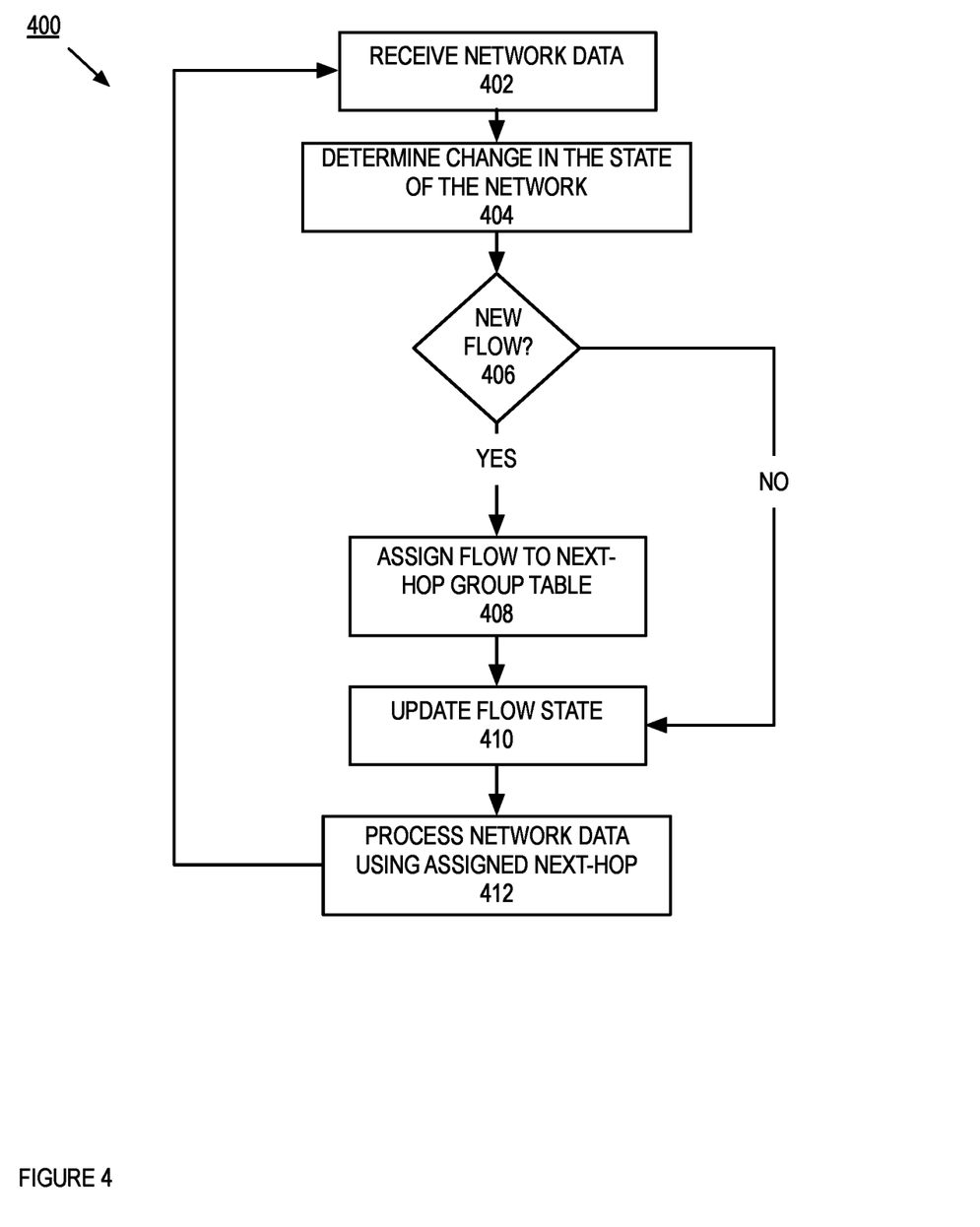
FIG. 4 is a flow diagram of one embodiment of a process to process network data.

As described above, using the same or similar ECMP nexthop selection function for a class of network elements can increase the resiliency of the flows in the datacenter fabric (e.g., the same ECMP nexthop selection function for a class of leaf, spine and/or super spine network elements). In one embodiment, a network element can further increase the resiliency of the flows by mapping a given nexthop to a fixed index in the ECMP nexthop group table so that the order of nexthop discoveries for a given ECMP route there have minimum disruption for the existing flows. FIG. 4 is a flow diagram of one embodiment of a process 400 to process network data. In one embodiment, process 400 receives network data at block 402. In one embodiment, the network data can be a packet of network data (e.g., an Ethernet packet, an IP packet, and/or some other type of packet). At block 404, process 400 determines if there is a change in the network. In one embodiment, the change can be a new flow of packets that the network element is processing. For example and in one embodiment, the network element can detect a new TCP session between two endpoints in the network.

At block 406, process 400 determines if the change in the state of the network is a new flow. In one embodiment, process 400 determines a new flow based on the based on at least detecting a TCP packet with the SYN flag set. If there is a new flow, execution proceeds to block 408 below. If there is not a new flow, execution proceeds to block 410 below.

Process 400 assigns the new flow to the ECMP nexthop group table at block 408. In one embodiment, process 400 can assign the flow to one of the existing allocated slots for the ECMP groups in the ECMP nexthop group table, such as the ECMP nexthop group table 212 as described in FIG. 2 above. In this embodiment, process 400 selects the slot based on a hash of the packet in the flow using the ECMP nexthop selection function. In one embodiment, process 400 additionally updates the number of flows filed in the ECMP nexthop group table in the flow counter field. At block 410, process 400 updates the flow state at block 410. In one embodiment, process 400 updates the last timestamp field and the estimate flow activity field of the ECMP nexthop group table. In one embodiment, the timestamp represents the last timestamp a packet for a flow mapped to this nexthop has been processed by process 400. In one embodiment, process 400 updates the estimated flow activity. In one embodiment, the estimated flow activity is a computed measurement updated against the slot, every time a packet gets switched through using that slot in the next hop group table. This metric measures how "busy" the slot is with respect to the traffic in absolute bandwidth terms. In one embodiment, the estimate flow activity (EFA) is calculated using the following weighted average formula:

$$EFA=(1-\alpha)*EFA+\alpha*(timeNow-timestampIntheSlot)$$

Timestamp against the slot is then updated with the current timestamp.

$$timestampIntheSlot=timeNow$$

Essentially, in this embodiment, (timeNow−timestampIntheSlot) provides inter-arrival time for packets for that slot. In addition, $\alpha$ can be the weight that is bounded between 0 and 1. A weight of 1 will result in accounting only for the latest packet arrival event. Lower the EFA, higher the traffic through the slot. A user policy can make use of this variable in arriving at a decision to evict the slot. This measure will provide an important feedback as how much of traffic can potentially be disturbed if we choose to replace it with the new nexthop.

Figure 5:
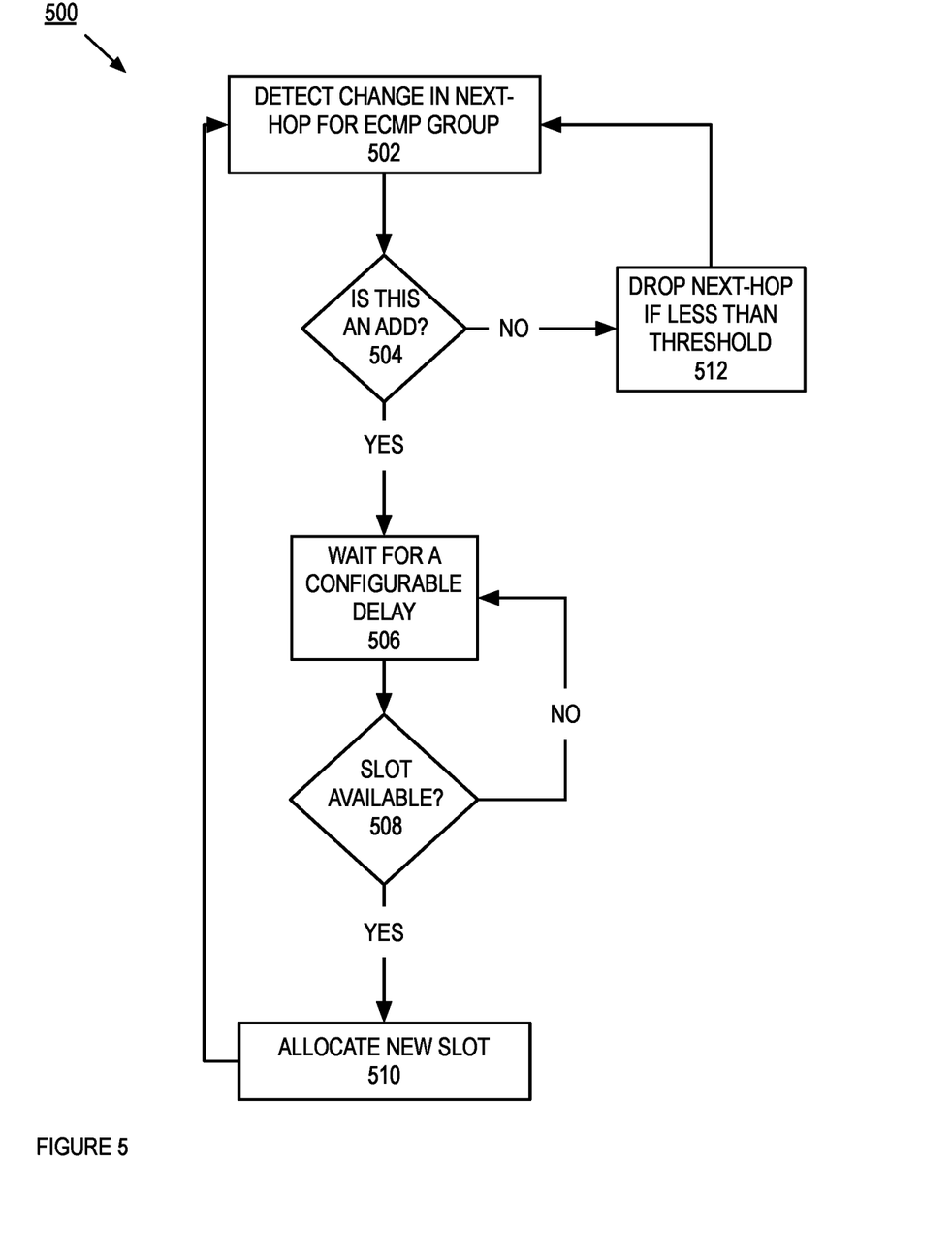
FIG. 5 is a flow diagram of one embodiment of a process to allocate a new slot in an ECMP group table.

In addition, to processing network data based on flows, the network elements can detect the addition or withdrawal of nexthops for a service, such as a service that uses an anycast IP address. FIG. 5 is a flow diagram of one embodiment of a process to allocate a new slot in an ECMP group table. In one embodiment, an ECMP module performs process 500 to allocate a new slot in an ECMP group table, such as the ECMP module 206 as described in FIG. 2 above. In FIG. 5, process 500 beings by detecting a change in the nexthops for an ECMP group at block 502. In one embodiment, the change can be an advertisement or withdrawal of an anycast IP address that indicates an endpoints interest or disinterest in the service. In case of a new advertisement of a service endpoint, this makes a leaf network element attached to the endpoint to be a new member in the ECMP set, which triggers the desire to update all the spine network element's nexthop for that anycast IP with this new information.

At block 504, process 500 determines if this change an add to the ECMP nexthop group. If this is an add, execution proceeds to block 506. Otherwise, execution proceeds to block 510 below. In one embodiment, process 500 detects an add to the ECMP nexthop group by receiving an advertisement for a service on an anycast IP address. At block 506, process 500 waits for a configurable delay. In one embodiment, the delay in adding the new nexthop can help relocate the application context for the existing flows to new service endpoint so that there will be no disruption when the old flow shows at the new endpoint. In this embodiment, the delay can be for zero or more seconds.

At block 508, process 500 determines if there is a slot available. If there is an available slot, process 500 allocates the slot for the next nexthop at block 510. In one embodiment, process 500 populates the nexthop pointer for the new nexthop, and updates the flow counter, last timestamp and estimate flow activity for this slot. In one embodiment, the customer can also define flow aware policies by making use of the following "flow aware" variables. In one embodiment, the flow aware variables are the number of flows that are currently mapped to that slot and the "Flow Activity" per slot within an ECMP next hop group set in the ECMP group table. In this embodiment, "Flow Activity" is a computed variable that measures the aggregated usage of the slot in absolute bandwidth terms with respect to traffic mapped to that slot. Execution proceeds to block 502 above. If there is not an available slot, execution proceeds to block 506 above.

At block 512, process 500 drops the nexthop if above/below a flow activity. In one embodiment, process 500 drops the nexthop by freeing up the slot for another nexthop. For example and in one embodiment, a nexthop eviction happens when the "Flow Activity" is above/below a threshold. Alternatively, one can include both the number of flows and "Flow Activity" to define the combined necessary condition to be met for eviction. Execution proceeds to block 502 above.

Figure 6A:
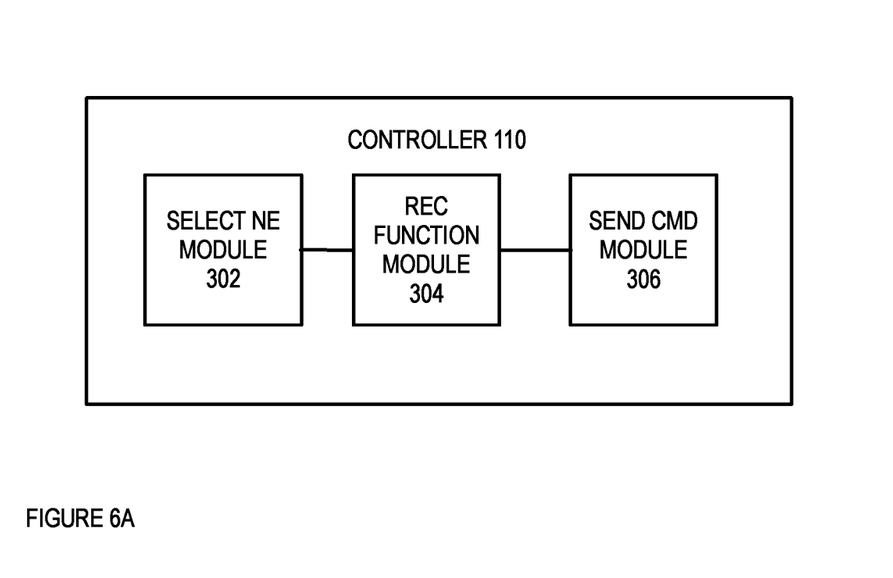
FIG. 6A is a block diagram of one embodiment of controller that installs an ECMP function on one or more network elements.

FIG. 6A is a block diagram of one embodiment of controller 110 that installs an ECMP function on one or more network elements. In one embodiment, the controller 110 includes a select network element module 302, receive function module 304, and send command module 306. In one embodiment, the select network element module 302 selects the network element(s) as described in FIG. 3A, bock 302 above. The receive function module 304 receives the ECMP nexthop selection function as described in FIG. 3A, bock 304 above. The send command module 306 sends a command to each of the selected network elements as described in FIG. 3A, bock 306 above.

Figure 6B:
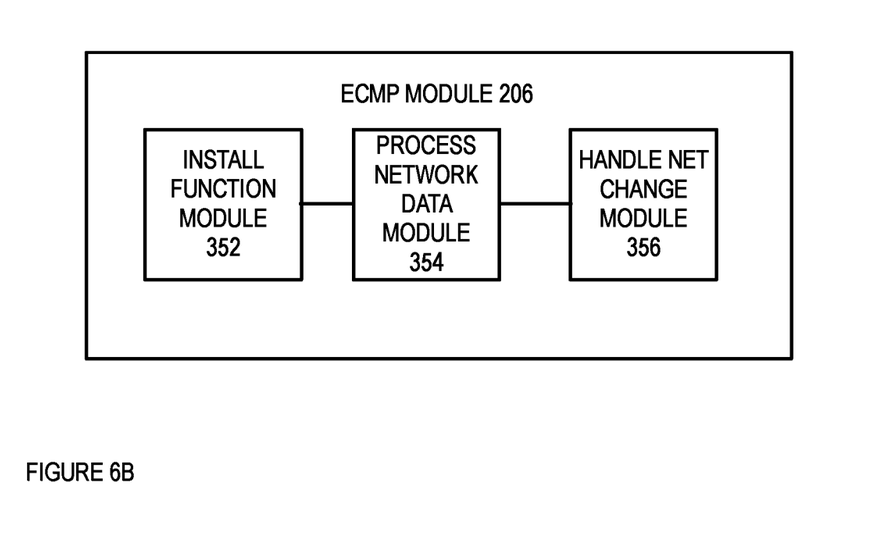
FIG. 6B is a block diagram of one embodiment of an ECMP function module that installs an ECMP function on a network element.

FIG. 6B is a block diagram of one embodiment of an ECMP function module 206 that installs an ECMP function on a network element. In one embodiment, the ECMP function module 206 includes an install function module 352, process network data module 354, and handle network change module 356. In one embodiment, the install function module 352 installs an ECMP function as described in FIG. 3B above. The process network data module 354 processes the received network data as described in FIG. 4 above. The handle network change module 356 handles a change in the network as described in FIG. 5 above.

Figure 7:
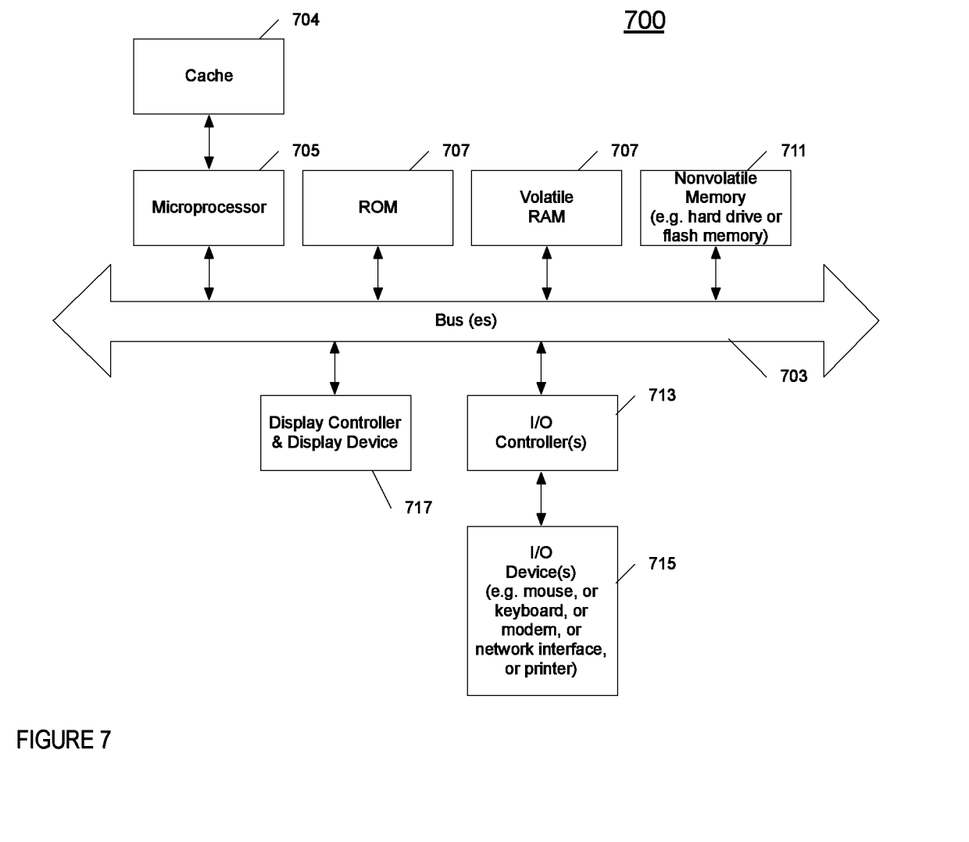
FIG. 7 illustrates one example of a typical computer system, which may be used in conjunction with the embodiments described herein.
Figure 8:
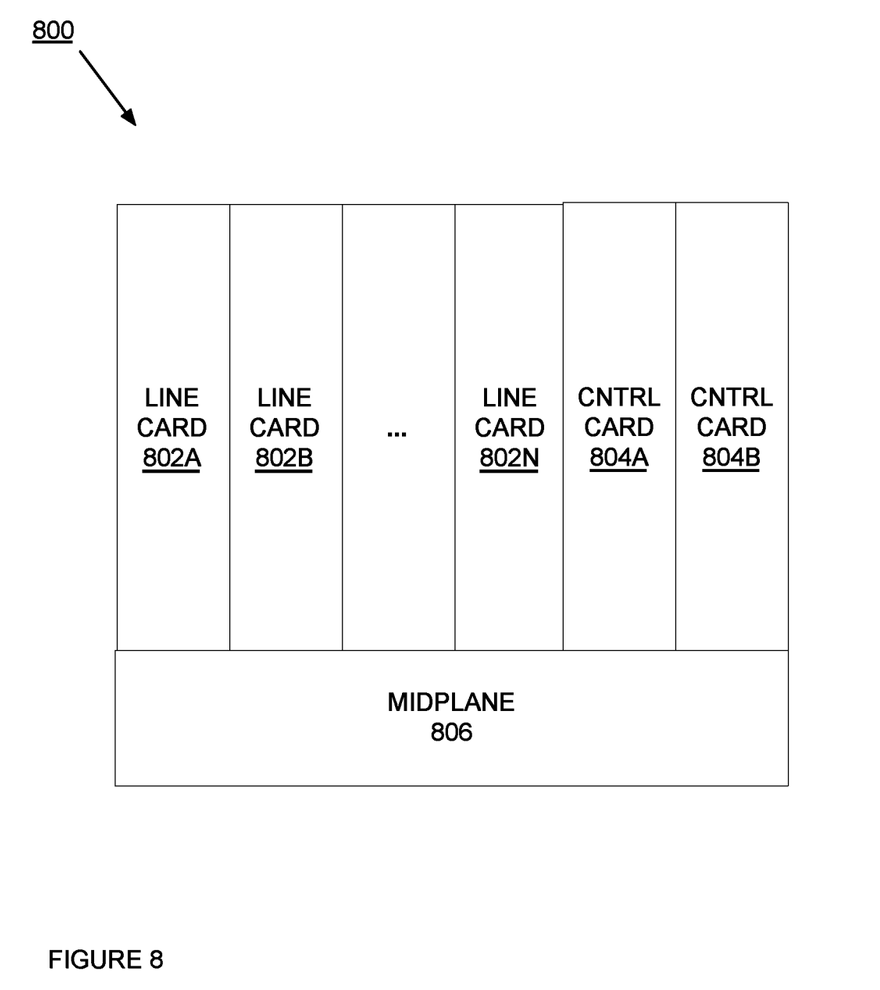
FIG. 8 is a block diagram of one embodiment of an exemplary network element that increases resiliency in the fabric and in the presence of service advertisements and withdrawals.

FIG. 7 shows one example of a data processing system 700, which may be used with one embodiment of the present invention. For example, the system 700 may be implemented as a network element, including a network element 204 as shown in FIG. 2. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

FIG. 7 is a block diagram of one embodiment of an exemplary network element 700 that increases resiliency in the fabric and in the presence of service advertisements and withdrawals. In FIG. 7, the midplane 707 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., increasing resiliency in the fabric and in the presence of service advertisements and withdrawals). In one embodiment, the controller cards 704A-B increases resiliency in the fabric and in the presence of service advertisements and withdrawals as described in FIGS. 3-5. In this embodiment, one or both of the controller cards 704A-B include ECMP module, such as the ECMP module 206 as described in FIG. 6B above. It should be understood that the architecture of the network element 700 illustrated in FIG. 7 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "selecting," "mapping," "receiving," "sending," "allocating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process network data in an equal cost multi-path (ECMP) group, the method comprising:
   receiving the network data, the network data is part of network data flow;
   detecting that the network data flow is a new network data flow;
   selecting a transmitting nexthop from a plurality of nexthops of the ECMP group;
   mapping the new network flow to a slot of a table in an ECMP group, wherein the mapping of the new network flow does not change after an addition of a new nexthop to the ECMP group, wherein an addition to the ECMP group is in response to a service advertisement of a service that is coupled to the new nexthop; and
   transmitting the network data using the transmitting nexthop.

2. The non-transitory machine-readable medium of claim 1, wherein the mapping of new network flow does not change after a withdrawal of an existing nexthop to the ECMP group.

3. The non-transitory machine-readable medium of claim 2, wherein the withdrawal to the ECMP group is in response to a service withdrawal of a service that is coupled to the existing nexthop.

4. The non-transitory machine-readable medium of claim 1, wherein ECMP is a routing strategy where nexthop packet forwarding to a destination occurs over multiple paths having equal costs in a routing metric.

5. The non-transitory machine-readable medium of claim 1, wherein the detecting is based on at least a detection of a transmission control protocol syn packet.

6. The non-transitory machine-readable medium of claim 1, wherein the detecting is based on at least deep packet inspection.

7. A non-transitory machine-readable medium having executable instructions to cause one or more processing units to perform a method to manage an equal cost multi-path (ECMP) group in a network element, the method comprising:

detecting an addition to a membership of an ECMP group, wherein the addition is a new nexthop for the ECMP group; and allocating a slot in an ECMP group table for the new nexthop, wherein a packet flow using this nexthop is mapped to the slot and wherein the mapping of the packet flow does not change after a further addition of a new nexthop to the ECMP group, wherein the allocating of the slot in the ECMP table is based on at least a user-defined policy to allocate the new slot after a user configurable delay.

8. The machine-readable medium of claim 7, wherein the user-defined policy is based on at least a flow aware variable, wherein the flow aware variable is selected from the group consisting of number of flows mapped to a slot in the ECMP table and a flow activity per slot.

9. The machine-readable medium of claim 8, wherein the flow activity computed variable that measures the aggregated usage of the slot in absolute bandwidth terms with respect to traffic mapped to that slot.

10. The machine-readable medium of claim 7, further comprising:

de-allocating a slot in the ECMP table in response to a service end point withdrawal.

11. A non-transitory machine-readable medium having executable instructions to cause one or more processing units to perform a method to install an equal cost multi-path (ECMP) nexthop selection function in a network element, the method comprising:

receiving information regarding a plurality of network elements in a network;

selecting a subset of network elements from the plurality of network elements, wherein each of the network elements in the subset share a class and participate in an ECMP group;

determining the ECMP next selection function for the subset of network elements; and sending a command to each of the network elements in the subset of network elements, wherein the command instructs the each of network elements to install the ECMP next selection function and the each of the network elements uses the ECMP next selection function to make ECMP nexthop decisions using the ECMP group.

12. The machine-readable medium of claim 11, wherein the class is based on at least a role a network element has in the network.

13. The machine-readable medium of claim 11, wherein the role is selected from a leaf, spine, and super spine.

14. A method to process network data in an equal cost multi-path (ECMP) group, the method comprising:

receiving the network data, the network data is part of network data flow;

detecting that the network data flow is a new network data flow;

selecting a transmitting nexthop from a plurality of nexthops of the ECMP group;

mapping the new network flow to a slot of a table in an ECMP group, wherein the mapping of the new network flow does not change after an addition of a new nexthop to the ECMP group, wherein an addition to the ECMP group is in response to a service advertisement of a service that is coupled to the new nexthop; and transmitting the network data using the transmitting nexthop.

15. A method to install an equal cost multi-path (ECMP) nexthop selection function in a network element, the method comprising:

receiving information regarding a plurality of network elements in a network;

selecting a subset of network elements from the plurality of network elements, wherein each of the network elements in the subset share a class and participate in an ECMP group;

determining the ECMP next selection function for the subset of network elements; and sending a command to each of the network elements in the subset of network elements, wherein the command instructs the each of network elements to install the ECMP next selection function and the each of the network elements uses the ECMP next selection function to make ECMP nexthop decisions using the ECMP group.

* * * * *